(12) United States Patent
Taki

(10) Patent No.: US 11,915,498 B2
(45) Date of Patent: Feb. 27, 2024

(54) READING SYSTEM, READING DEVICE, AND STORAGE MEDIUM

(71) Applicant: KABUSHIKI KAISHA TOSHIBA, Tokyo (JP)

(72) Inventor: Toshikazu Taki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/688,063

(22) Filed: Mar. 7, 2022

(65) Prior Publication Data

US 2022/0189182 A1 Jun. 16, 2022

Related U.S. Application Data

(60) Division of application No. 16/922,097, filed on Jul. 7, 2020, now Pat. No. 11,301,709, which is a (Continued)

(30) Foreign Application Priority Data

Feb. 16, 2018 (JP) ................................ 2018-026500

(51) Int. Cl.
*G06V 20/62* (2022.01)
*G06T 7/49* (2017.01)
(Continued)

(52) U.S. Cl.
CPC ............... *G06V 20/62* (2022.01); *G06T 7/49* (2017.01); *G06V 10/28* (2022.01); *G06V 10/454* (2022.01);
(Continued)

(58) Field of Classification Search
CPC ........ G06K 9/325; G06K 9/42; G06K 9/4638; G06K 9/6202; G06K 2209/03; G06K 9/38; G06K 9/4628; G06T 7/49
See application file for complete search history.

(56) References Cited

U.S. PATENT DOCUMENTS

| 2008/0089666 A1* | 4/2008 | Aman | G06K 9/00 386/228 |
| 2016/0371557 A1* | 12/2016 | Takahashi | G06K 9/32 |
| 2018/0129173 A1 | 5/2018 | Kusaka | |

FOREIGN PATENT DOCUMENTS

| CN | 101160592 A * | 4/2008 | ......... G06K 9/00416 |
| CN | 103118647 A | 5/2013 | |

(Continued)

OTHER PUBLICATIONS

International Search Report dated Nov. 27, 2018 in PCT/JP2018/035362 filed on September 25, 2018, 1 page.

*Primary Examiner* — Zhitong Chen
(74) *Attorney, Agent, or Firm* — Oblon, McClelland, Maier & Neustadt, L.L.P.

(57) ABSTRACT

According to one embodiment, a reading system includes an extractor, a determiner, and a reader. The extractor extracts a candidate image from an input image. The candidate image is of a portion of the input image in which a segment display is imaged. The determiner calculates an angle with respect to a reference line of each of a plurality of straight lines detected from the candidate image, and determines whether or not the candidate image is an image of a segment display based on a distribution indicating a relationship between the angle and a number of the straight lines. The reader reads a numerical value displayed in a segment display from the candidate image determined to be an image of a segment display.

19 Claims, 7 Drawing Sheets

Related U.S. Application Data continuation of application No. PCT/JP2018/035362, filed on Sep. 25, 2018.

(51) Int. Cl.
  *G06V 10/44* (2022.01)
  *G06V 10/75* (2022.01)
  *G06V 10/82* (2022.01)
  *G06V 10/28* (2022.01)

(52) U.S. Cl.
  CPC .......... *G06V 10/457* (2022.01); *G06V 10/751* (2022.01); *G06V 10/82* (2022.01); *G06V 2201/02* (2022.01)

(56) References Cited

FOREIGN PATENT DOCUMENTS

| | | | | |
|---|---|---|---|---|
| CN | 106874911 A | * | 6/2017 | ............ G06K 9/344 |
| JP | 02-044487 A | | 2/1990 | |
| JP | 11-316794 A | | 11/1999 | |
| JP | 2011-175523 A | | 9/2011 | |
| JP | 2017-010170 A | | 1/2017 | |
| JP | 2018-081668 A | | 5/2018 | |

* cited by examiner

READING SYSTEM, READING DEVICE, AND STORAGE MEDIUM

CROSS-REFERENCE TO RELATED APPLICATIONS

This application is a divisional application of U.S. application Ser. No. 16/922,097, filed Jul. 7, 2020, which is a continuation application of International Application PCT/JP2018/035362, filed on Sep. 25, 2018. This application also claims priority to Japanese Patent Application No. 2018-026500, filed on Feb. 16, 2018. The entire contents of each of the above-identified applications are incorporated herein by reference.

FIELD

Embodiments described herein relate generally to a reading system, a reading device, and a storage medium.

BACKGROUND

There is a system that reads a numerical value displayed in a segment display. It is desirable for the system to have high accuracy of reading the numerical value.

DETAILED DESCRIPTION

Figure 1:
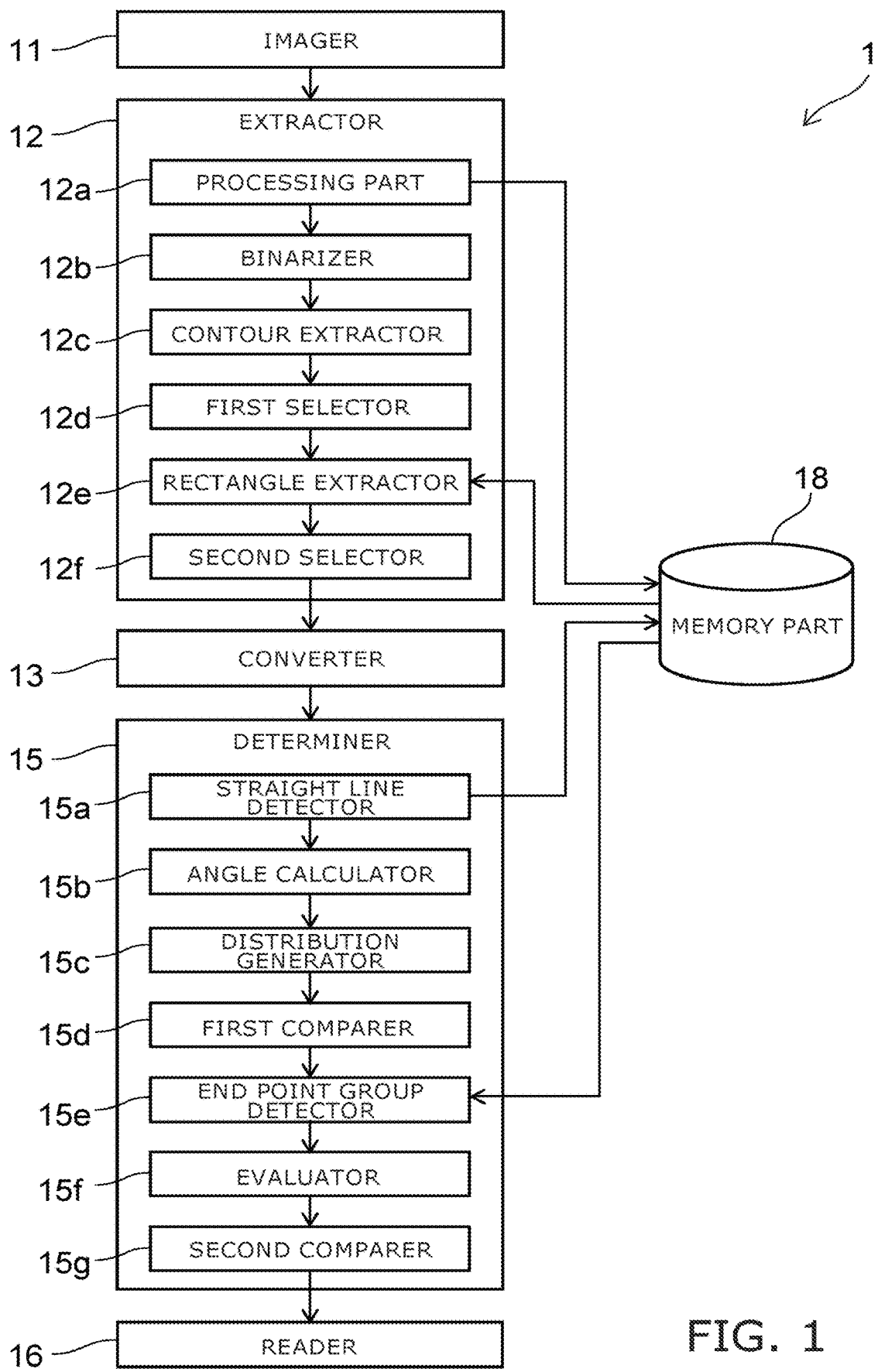
FIG. 1 is a block diagram illustrating a configuration of a reading system according to an embodiment.

According to one embodiment, a reading system includes an extractor, a determiner, and a reader. The extractor extracts a candidate image from an input image. The candidate image is of a portion of the input image in which a segment display is imaged. The determiner calculates an angle with respect to a reference line of each of a plurality of straight lines detected from the candidate image, and determines whether or not the candidate image is an image of a segment display based on a distribution indicating a relationship between the angle and a number of the straight lines. The reader reads a numerical value displayed in a segment display from the candidate image determined to be an image of a segment display.

Various embodiments are described below with reference to the accompanying drawings.

In the specification and drawings, components similar to those described previously or illustrated in an antecedent drawing are marked with like reference numerals, and a detailed description is omitted as appropriate.

FIG. 1 is a block diagram illustrating a configuration of a reading system according to an embodiment.

The reading system according to the embodiment is used to read a numerical value displayed in a segment display from an image including the segment display.

In the embodiment, a segment display refers to a display that includes some display information such as a numeral, a character, etc., configured by the display of multiple segments.

As illustrated in FIG. 1, the reading system 1 according to the embodiment includes an imager 11, an extractor 12, a converter 13, a determiner 15, a reader 16, and a memory part 18.

The imager 11 acquires a static image by imaging a segment display. The imager 11 outputs the acquired image to the extractor 12. When a video image is imaged by the imager 11, the imager 11 cuts out a static image from the video image and outputs the static image to the extractor 12. An object other than a segment display may be imaged in the image.

The extractor 12 extracts a candidate of the image of the segment display from the image that is input. Here, the image that is imaged by the imager 11 and input to the extractor 12 is called the input image. The image that is a portion of the input image and is a candidate of the segment display is called the candidate image. The candidate image is a portion of the input image in which the extractor 12 determines that the segment display is imaged. Multiple candidate images may be output from the extractor 12.

As one specific example, the extractor 12 includes a processing part 12a, a binarizer 12b, a contour extractor 12c, a first selector 12d, a rectangle extractor 12e, and a second selector 12f.

For example, the processing part 12a generates a processed image in which the input image is converted into a grayscale. The processing part 12a outputs the processed image to the binarizer 12b. At this time, for example, the processing part 12a may output, to the binarizer 12b, a processed image in which the input image is reduced to a preset size. At this time, the processing part 12a stores, in the memory part 18, the original-size image that is not reduced.

The binarizer 12b generates a binary image illustrated using white and black by binarizing the processed image that is input. For example, the contour extractor 12c extracts the contour of a region illustrated using white in the binary image.

The first selector 12d calculates the surface area of the region surrounded with the contour. When multiple contours are extracted, the surface area of each region is calculated. The first selector 12d compares each calculated surface area to a prescribed threshold and selects only regions of which the surface area is not less than the threshold. Thereby, regions of which the surface area is too small are excluded from the candidates.

The rectangle extractor 12e extracts a rectangle by performing a straight-line approximation of the selected region. For example, the rectangle extractor 12e acquires the coordinates of the vertices of the extracted rectangle.

The second selector 12f compares the extracted rectangular region to a preset condition and selects a region matching the condition. The condition may be, for example, the ratio of the vertical dimension and the lateral dimension of the rectangle being within a prescribed range, the angles of the vertices being within a prescribed range, all vertices of the rectangle not being in the outer frame vicinity of the image (e.g., within three pixels from the outer frame), etc. The second selector 12f outputs the selected rectangle to the converter 13 as a final candidate image.

The converter 13 performs the following first processing and second processing.

In the first processing, the converter 13 determines whether or not the candidate image input from the extractor 12 is distorted. When it is determined that the candidate image is distorted, the converter 13 corrects the distortion so that the candidate image approaches an image that is imaged from the front.

In the second processing, the converter 13 determines whether or not the size of the candidate image matches a preset specified size. When the size of the candidate image does not match the specified size, the converter 13 corrects the candidate image so that the size of the candidate image approaches the specified size.

For example, the converter 13 corrects the distortion and the size by performing a projective transformation of the candidate image. The converter 13 outputs the corrected candidate image to the determiner 15. When it is determined that the candidate image is not distorted and the size of the candidate image matches the specified size, the converter 13 outputs the input candidate image as-is to the determiner 15.

The determiner 15 includes a straight line detector 15a, an angle calculator 15b, a distribution generator 15c, a first comparer 15d, an end point group detector 15e, an evaluator 15f, and a second comparer 15g.

The straight line detector 15a detects multiple straight lines included in the image on which edge detection is performed. For example, in the detection of the straight lines, the start points and the end points of the line segments are detected. The straight line detector 15a outputs the detection result to the angle calculator 15b and stores the detection result in the memory part 18. The straight line detector 15a detects line segments not less than a prescribed length with a prescribed angular resolution.

The angle calculator 15b calculates the angle with respect to a reference line for each straight line. For example, the angle calculator 15b uses the image bottom side (a straight line extending horizontally) as the reference line, and calculates the angle between the reference line and the straight line for each straight line. Based on the calculation result, the distribution generator 15c generates a distribution indicating the relationship between the angle and the number of straight lines.

The first comparer 15d compares the generated distribution and a preset first condition. For example, the first condition is when the sum of the total number of straight lines at a first angle vicinity and the total number of straight lines at the vicinity of a second angle tilted with respect to the first angle in the generated distribution is not less than a preset value.

For example, the first angle is 0 degrees, and the second angle is 80 degrees. The "vicinity" includes, for example, a range not less than −10 degrees and not more than +10 degrees with the first angle or the second angle at the center. In such a case, the first comparer 15d compares the sum of the total number of straight lines within a range not less than −10 degrees and not more than 10 degrees and the total number of straight lines within a range not less than 70 degrees and not more than 90 degrees in the distribution to the preset value.

For example, in the image, the angle of a line parallel to the lateral direction is taken to be 0 degrees, and the angle of a line parallel to the vertical direction is taken to be 90 degrees. When the segment display to be read is a seven-segment display, many straight lines at about 0 degrees and many straight lines at about 80 degrees are detected. When the segment display to be read is a fourteen-segment display or a sixteen-segment display, many straight lines at about 0 degrees, many straight lines at about 45 degrees, and many straight lines at about 80 degrees are detected.

The first condition is set based on these characteristics. When the distribution satisfies the first condition, the likelihood of the candidate image including a segment display is high.

When the distribution satisfies the first condition, the first comparer 15d outputs the determination result to the end point group detector 15e. When the distribution does not satisfy the first condition, the likelihood of the candidate image not being included in the segment display is high; therefore, for example, the processing ends.

When the determination result from the first comparer 15d is input, for example, the end point group detector 15e refers to the detection result of the straight lines stored in the memory part 18. Then, from the detection result of the straight lines, the end point group detector 15e detects end point groups where end points (start points and end points) of straight lines are clustered.

For example, the end point group detector 15e subdivides the candidate image into multiple areas (a matrix configuration) at a prescribed spacing in the lateral direction and a prescribed spacing in the vertical direction and extracts, as the end point groups, areas in which a prescribed number or more of end points exist. Multiple end point groups may be detected from the candidate image when a segment display is included in the candidate image. The positions at which these end point groups are detected correspond to the positions of the end portions of the segments.

For example, the evaluator 15f calculates a vector from one end point group toward an end point group adjacent to the one end point group for each of the end point groups. For example, the vector is obtained by determining the movement amount necessary for the one end point group to be overlaid on the other end point group. The evaluator 15f calculates the ratio of the sizes of the adjacent vectors and the angle between the vectors. The evaluator 15f outputs these evaluation values to the second comparer 15g.

The second comparer 15g compares the evaluation value and the second condition. The second condition includes, for example, a first range relating to the ratio of the sizes recited above and a second range relating to the angle recited above. When the ratio of the sizes recited above is within the first range and the angle recited above is within the second range, the second comparer 15g determines that the candidate image is an image of a segment display and outputs the candidate image to the reader 16.

For example, a general seven-segment display includes segments (vertical segments) extending in the vertical direction and segments (lateral segments) extending in the lateral direction when viewed in front-view. Typically, the ratio of the lengths of the vertical segments is substantially 1. The ratio of the length of a lateral segment to the length of a vertical segment is 1 or less. The angle between a vertical segment and a lateral segment is about 80 degrees or about 100 degrees. The angle between the vertical segments is 180 degrees.

The ratio of the sizes of the vectors calculated by the evaluator 15f corresponds to the ratio of the lengths of the vertical segments or the ratio of the lengths of the vertical segment and the lateral segment. The angle between the vectors calculated by the evaluator 15f corresponds to the angle between the vertical segment and the lateral segment or the angle between the vertical segments. Accordingly, it can be determined whether or not the candidate image is an image of a segment display by comparing these evaluation values to the preset first range and the preset second range.

When multiple ratios of the sizes and multiple angles are calculated by the evaluator 15f, for example, the second comparer 15g compares each ratio of the sizes to the first range and compares each angle to the second range.

For example, the second comparer 15g detects the total number of ratios of the sizes that are calculated. The second comparer 15g detects the number of ratios of the sizes that are included in the first range. Then, the second comparer 15g calculates the proportion of the number of ratios of the sizes included in the first range to the total number.

Similarly, for example, the second comparer 15g calculates the proportion of the number of angles that are included in the second range to the total number of angles that are calculated.

The second comparer 15g determines that the candidate image is an image of a segment display when the two calculated proportions each are not less than preset thresholds.

The reader 16 reads the numerical value displayed in the segment display from the candidate image that is input. For example, the reader 16 cuts out the numeral from the candidate image that is input and reads the numerical value by detecting the lit segments. For example, the reader 16 causes a monitor to display the numerical value that is read and/or outputs the numerical value to a database.

The memory part 18 stores information necessary for the processing of the reading system 1 and data generated in the processing. For example, the thresholds and the conditions that are compared when performing the determinations, etc., are stored in the memory part 18.

An operation of the reading system 1 according to the embodiment will now be described with reference to FIG. 2 to FIG. 3H.

Figure 2:
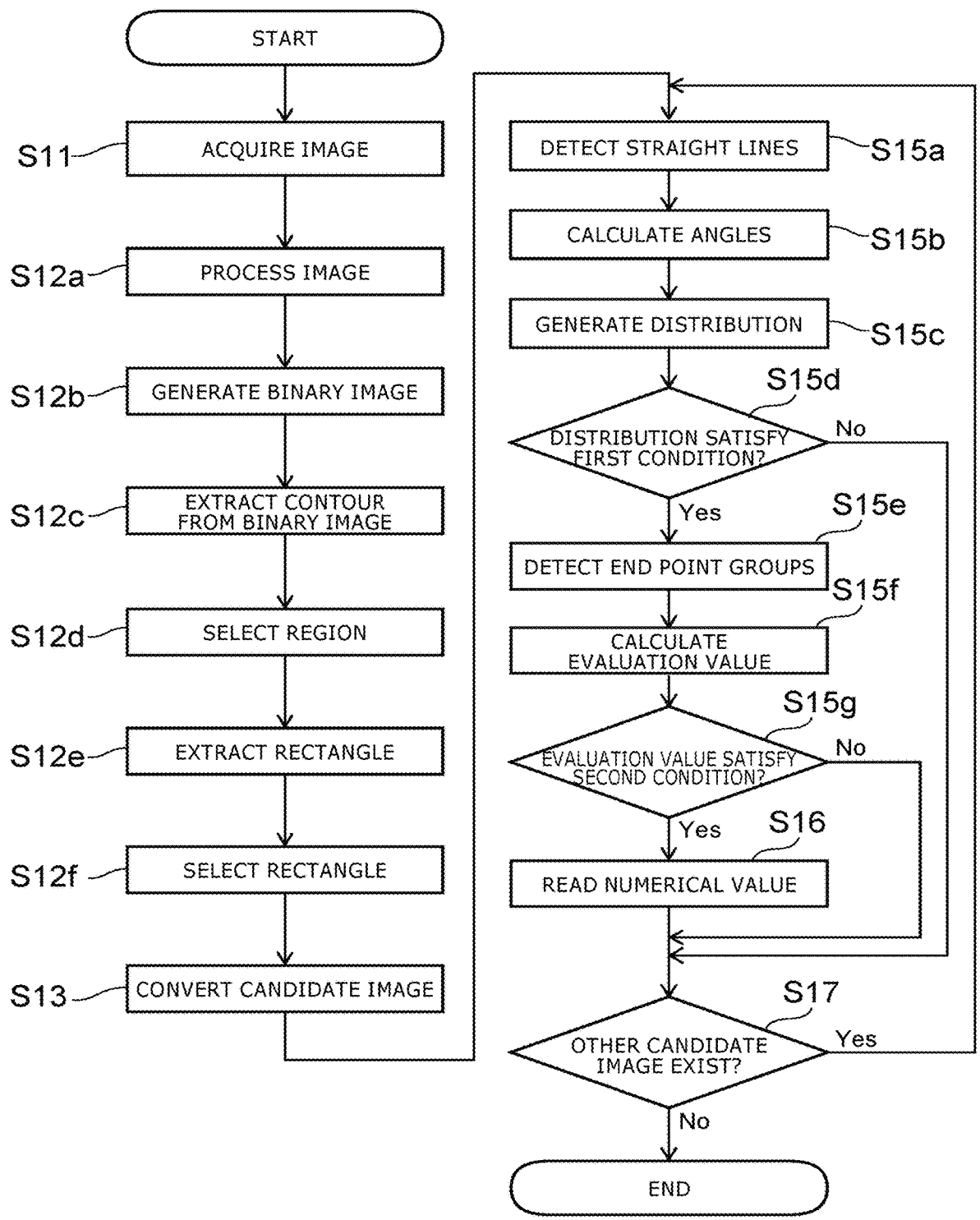
FIG. 2 is a flowchart illustrating the operation of the reading system according to the embodiment.

FIG. 2 is a flowchart illustrating the operation of the reading system according to the embodiment.

FIGS. 3A to 3H illustrate the processing according to the reading system according to the embodiment.

Figure 3A:
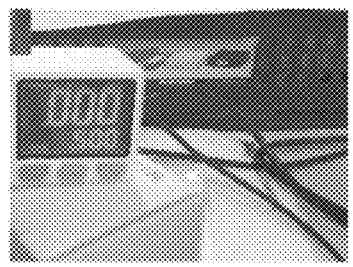
FIGS. 3A to 3H illustrate the processing according to the reading system according to the embodiment.
Figure 3B:

The imager 11 acquires an image by imaging a segment display (step S11 of FIG. 2). The processing part 12a processes the input image (step S12a). A processed image in which the input image is reduced and grayscaled and an original-size image in which only grayscaling of the input image is performed are generated thereby. FIG. 3A is an example of the processed image. The binarizer 12b generates a binary image as illustrated in FIG. 3B by binarizing the processed image (step S12b). The contour extractor 12c extracts a contour of the binary image (step S12c).

Figure 3C:
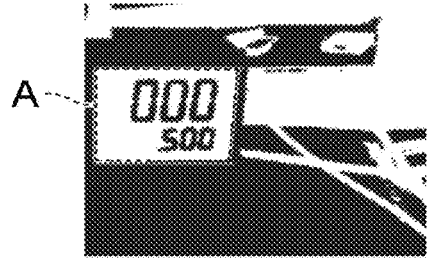
Figure 3D:
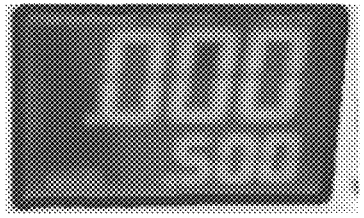
Figure 3E:
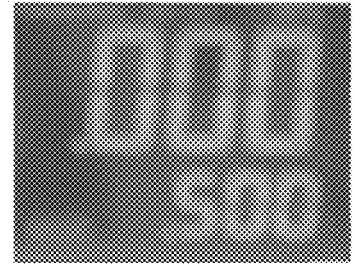

The first selector 12d selects a region surrounded with the contour (step S12d). For example, the region that is surrounded with a frame A as illustrated in FIG. 3C is selected thereby. The rectangle extractor 12e extracts a rectangle from the original-size image based on the extraction result of the rectangle in the selected region (step S12e). The second selector 12f selects the extracted rectangle (step S12f) and outputs the extracted rectangle as a candidate image. FIG. 3D illustrates the rectangle output as the candidate image. As illustrated in FIG. 3E, the converter 13 converts the candidate image to correct the distortion. For example, the converter 13 corrects the distortion and the size by performing a projective transformation of the candidate image (step S13).

Figure 3F:
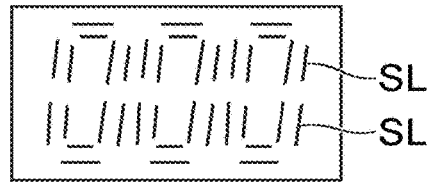
Figure 3G:
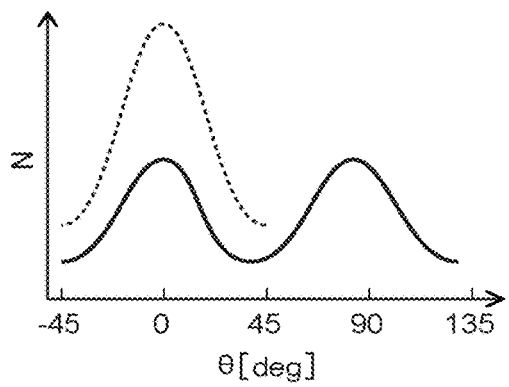

As illustrated in FIG. 3F, the straight line detector 15a detects multiple straight lines SL from the candidate image (step S15a). FIG. 3F and subsequent drawings illustrate only a portion of the candidate image. The angle calculator 15b calculates the angle of each straight line SL (step S15b). As illustrated in FIG. 3G, the distribution generator 15c generates the distribution indicating the relationship between an angle θ and a number N of straight lines (step S15c).

The first comparer 15d determines whether or not the distribution satisfies the first condition (step S15d). For example, the first comparer 15d makes a fold at an angle between the peak at the vicinity of 0 degrees and the peak at the vicinity of 80 degrees to overlay these peaks. The distribution illustrated by the broken line in FIG. 3G is generated thereby. The first comparer 15d calculates the total number of the number N of straight lines within a range not less than −10 degrees and not more than 10 degrees in the distribution and compares the total number to a preset value.

Figure 3H:
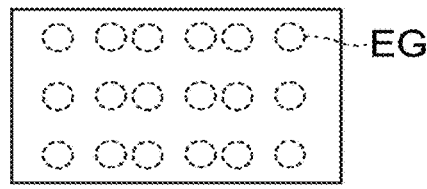

When the first condition is satisfied (when the total number is not less than the value), the end point group detector 15e detects end point groups EG as illustrated in FIG. 3H from the detection result of the straight lines illustrated in FIG. 3F (step S15e). The evaluator 15f calculates the vectors connecting the adjacent end point groups to each other and calculates the evaluation values (the angles and the ratio of the sizes) (step S15f).

The second comparer 15g determines whether or not the evaluation values satisfy the second condition (step S15g). When the evaluation values satisfy the second condition, the reader 16 reads the numerical value of the segment display from the candidate image (step S16).

The determiner 15 determines whether or not another candidate image exists for which steps S15a to S15g have not yet been performed (step S17). When another candidate image exists, step S15a is performed for that candidate image. When no other candidate image exists, the processing ends.

Effects of the embodiment will now be described.

As described above, when reading the segment display, a candidate image is extracted from the input image as a candidate of a portion in which a segment display is imaged. Conventionally, for example, a correction of distortion or the like of the extracted candidate image is performed as appropriate, and the numerical value of the segment display is read from the candidate image.

However, for example, there are cases where a displayer that is similar to a segment display is included in the candidate image. In such a case, there is a possibility that an erroneous detection may occur due to reading the numerical value of the other displayer as the numerical value of a segment display.

To suppress such an erroneous detection, the reading system 1 according to the embodiment determines whether or not the candidate image includes a segment display based on the result of the straight line detection and the result of the end point group detection for the candidate image. The likelihood of the erroneous detection can be reduced by reading only the candidate images determined to include segment displays.

The determination that is based on the result of the straight line detection and the result of the end point group detection utilizes general features of the segment display (the length and the angle of the segment). Therefore, the reading system 1 is applicable to diverse segment displays, and the numerical values of the segment displays can be read with higher accuracy.

Although the determination is performed by the two comparers of the first comparer 15d and the second comparer 15g in the example illustrated in FIG. 1 to FIG. 3H, the determination may be performed by only one of the first comparer 15*d* or the second comparer 15*g* in the reading system 1. In such a case as well, the reading accuracy of the numerical value of the segment display can be increased because the candidate images having a low likelihood of including a segment display can be excluded before the reading by the reader 16. To further increase the reading accuracy, it is desirable for both the first comparer 15*d* and the second comparer 15*g* to be provided.

Although the reading system 1 according to the embodiment includes the imager 11 in the example illustrated in FIG. 1, the reading system 1 may not include the imager 11.

For example, an image that is imaged by another imaging device may be input to the reading system 1, and the reading system 1 may read the numerical value of the segment display from the input image.

The reading system 1 may not include the converter 13; however, it is desirable for the converter 13 to be included to increase the accuracy of the reading.

For example, the accuracy of the match ratio can be increased by the distortion of the candidate image being corrected by the converter 13. Thereby, the candidate image in which the segment display is imaged can be sorted more accurately.

An example is shown in FIGS. 3A to 3H in which a numerical value displayed in a seven-segment display is read. However, the segment display that is readable by the reading system 1 according to the embodiment is not limited to a seven-segment display. The segment display to be read may be a fourteen-segment display or a sixteen-segment display.

The processing of the extractor 12 is modifiable as appropriate as long as the candidate image can be extracted. For example, the processing part 12*a* or the binarizer 12*b* is unnecessary when the size of the input image is small, when the input image is pre-binarized, etc. The processing for extracting the candidate image from the input image also is modifiable as appropriate. Such modifications are described below.

First Modification

Figure 4:
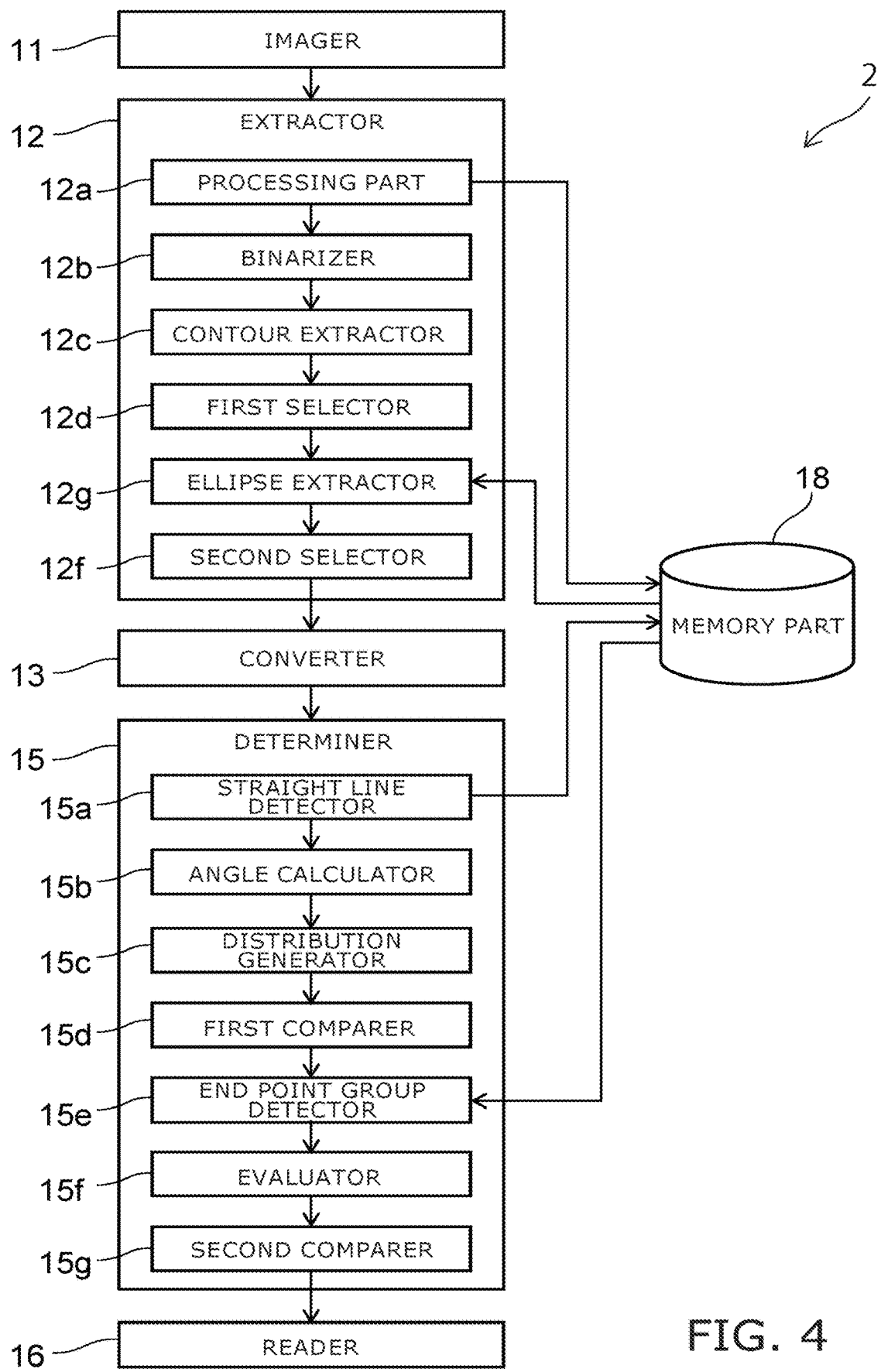
FIG. 4 is a block diagram illustrating a configuration of a reading system according to a first modification of the embodiment.

FIG. 4 is a block diagram illustrating a configuration of a reading system according to a first modification of the embodiment.

In the example of FIG. 1 to FIG. 3H, the frame of the display region of the segment display is rectangular. Therefore, the rectangle extractor 12*e* is provided in the extractor 12 to match the shape of the display region.

When the frame of the display region is circular, an ellipse extractor 12*g* is provided instead of the rectangle extractor 12*e* in the extractor 12 as in the reading system 2 illustrated in FIG. 4. The ellipse extractor 12*g* extracts an ellipse from the region selected by the first selector 12*d*. At this time, the ellipse extractor 12*g* acquires the coordinates of the extracted ellipse. The ellipse extractor 12*g* extracts the image of an ellipse corresponding to the coordinates recited above from the original-size image and outputs the extracted image to the second selector 12*f*.

The second selector 12*f* selects an ellipse that matches a preset condition by comparing the image of the ellipse that is input to the preset condition. For example, the flattening of the ellipse, the distribution of the luminance, etc., are used as the condition. The second selector 12*f* outputs the image of the selected ellipse as the candidate image to the converter 13. Thereafter, the processing is similar to that of the example described in reference to FIG. 1 to FIG. 3H. In other words, the converter 13 corrects the distortion of the candidate image. Then, after the determination by the determiner 15, the numerical value of the segment display is read by the reader 16.

Second Modification

Figure 5:
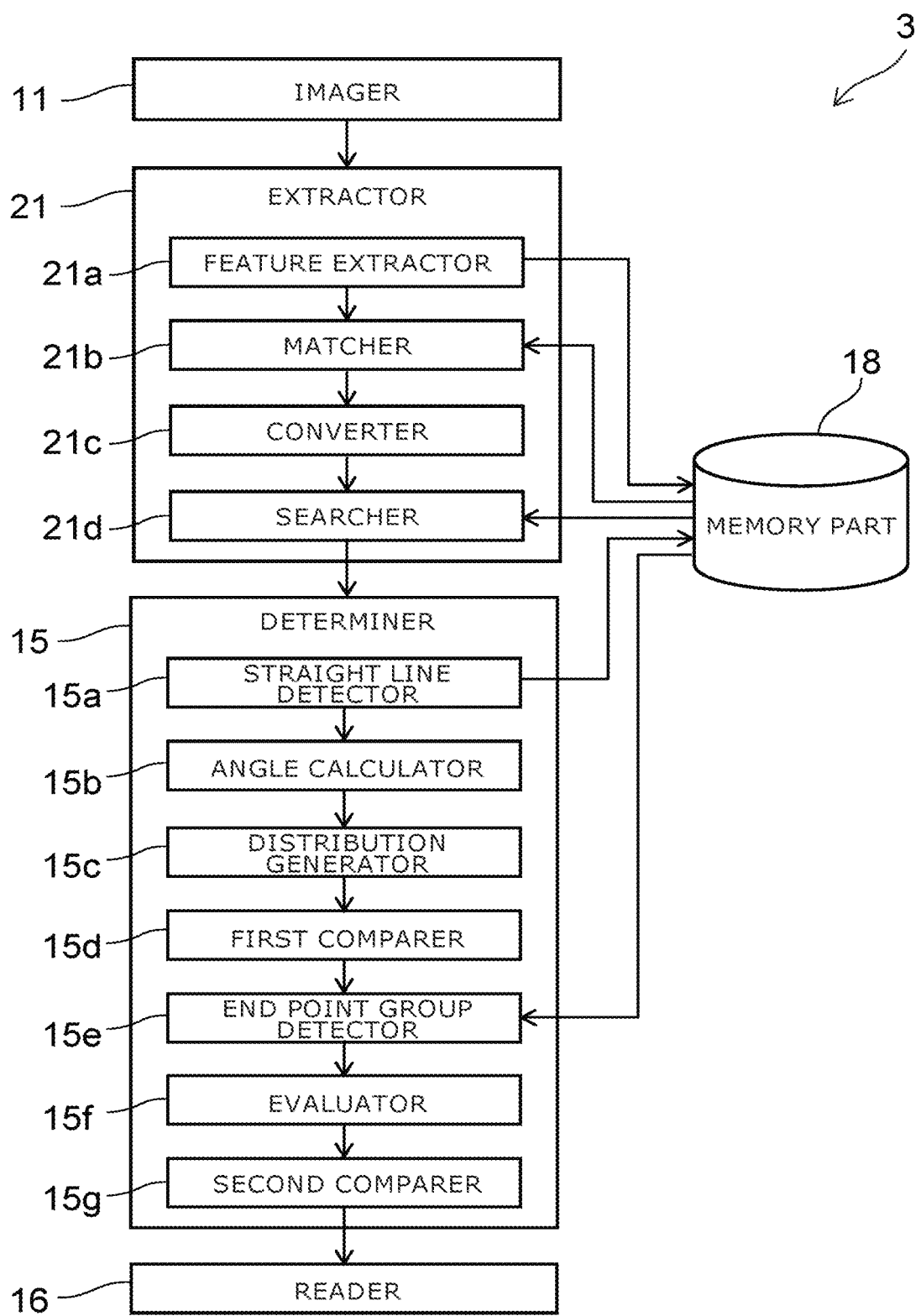
FIG. 5 is a block diagram illustrating a configuration of a reading system according to a second modification of the embodiment.

FIG. 5 is a block diagram illustrating a configuration of a reading system according to a second modification of the embodiment.

Compared to the reading system 1, the reading system 3 illustrated in FIG. 5 includes an extractor 21 instead of the extractor 12 and the converter 13.

In the reading system 3, before reading the numerical value of the segment display, only segment displays that are objects of the reading are imaged from the front by the imager 11. Here, the images in which only the segment display is imaged from the front are called template images.

The extractor 21 includes a feature extractor 21*a*, a matcher 21*b*, a converter 21*c*, and a searcher 21*d*.

The feature extractor 21*a* extracts a feature of the input image. The feature extractor 21*a* extracts features of template images by referring to the template images stored in the memory part 18. Or, the features of the template images may be pre-extracted by the feature extractor 21*a* and stored in the memory part 18. In such a case, the feature extractor 21*a* refers to the features of the template images stored in the memory part 18. The feature extractor 21*a* outputs the feature of the input image and the features of the template images to the matcher 21*b*.

The matcher 21*b* calculates a correction amount of the input image necessary for matching the feature of the input image to the features of the template images. For example, the matcher 21*b* calculates the correction amount necessary to cause the distorted segment display of the input image to approach an image that is imaged from the front. The matcher 21*b* outputs the calculated correction amount and the input image to the converter 13.

When the features cannot be matched to each other, the likelihood is high that a segment display is not included in the input image. Accordingly, in such a case, for example, the processing ends without calculating the correction amount.

The converter 21*c* converts the input image based on the correction amount that is input. Thereby, when the input image is distorted with respect to the template image, the distortion is corrected.

The searcher 21*d* refers to the template images stored in the memory part 18. Then, the searcher 21*d* searches for portions in the input image that match the template images. The searcher 21*d* outputs the matching portions as candidate images to the determiner 15.

Thereafter, the processing of the determiner 15 and the reader 16 is similar to that of the reading system 1 illustrated in FIG. 1.

For example, the extraction of the feature by the feature extractor 21*a* is performed using KAZE, AKAZE (Accelerated KAZE), SIFT (Scale-invariant feature transform), etc. For example, the matching by the matcher 21*b* is performed using KNN (K Nearest Neighbor), FLANN (Fast Library for Approximate Nearest Neighbors), etc. For example, the searching by the searcher 21*d* is performed using pattern matching based on the similarity between the images.

In the reading system 3 according to the modification, conversion of the input image using the feature and matching using the template images are performed. Namely, the entire region of the input image is converted; therefore, compared to the reading system 1, this is effective when multiple segment displays exist in the same plane.

Third Modification

Figure 6:
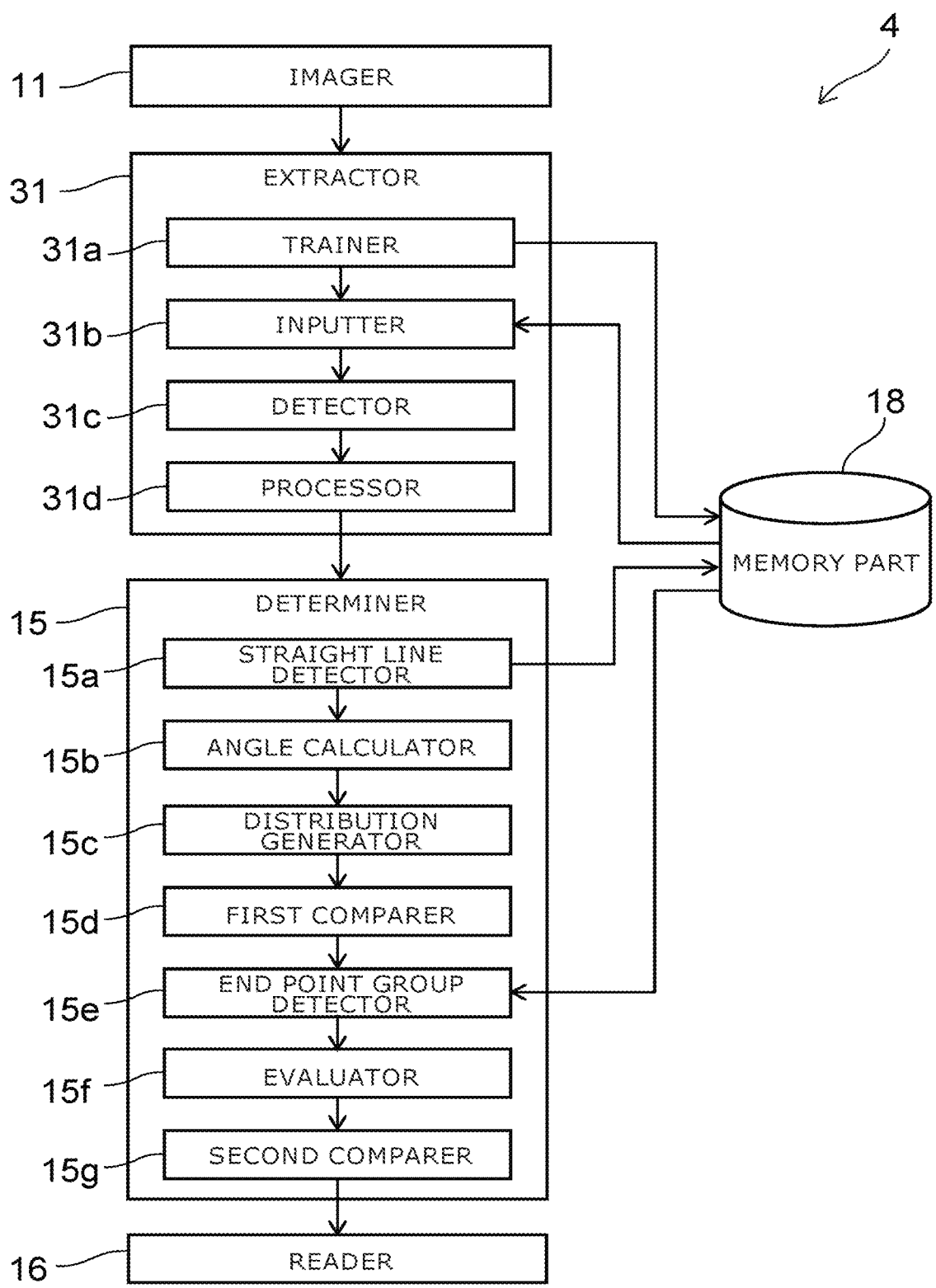
FIG. 6 is a block diagram illustrating a configuration of a reading system according to a third modification of the embodiment.

FIG. 6 is a block diagram illustrating a configuration of a reading system according to a third modification of the embodiment.

Compared to the reading system 1, the reading system 4 illustrated in FIG. 6 includes an extractor 31 instead of the extractor 12 and the converter 13. The extractor 31 includes a trainer 31a, an inputter 31b, a detector 31c, and a processor 31d.

In the reading system 4, the candidate image in which the segment display is imaged is extracted from the input image by using a neural network. For example, teacher data is input to the extractor 31 beforehand, and the neural network is trained. The teacher data includes, for example, distorted images including segment displays, data of the positions of the segment displays in the images, and the distortion amounts of the images.

The trainer 31a trains the neural network so that when image data is input, neurons respond (fire) for the data of the portions where the segment display is imaged, and neurons that correspond to the distortion amount of the image respond. The trainer 31a stores the trained neural network in the memory part 18. The training by the trainer 31a recited above may be performed by a processing device that performs the processing of the determiner 15 and/or the reader 16 or by another processing device. Favorably, the training recited above is performed by a processing device having faster calculation performance.

Subsequently, an image for reading the numerical value of the segment display is acquired by the imager 11, and the image is input to the extractor 31. When the image is input, the inputter 31b refers to the trained neural network stored in the memory part 18. Then, the inputter 31b inputs the data of the image to the neural network.

The detector 31c detects the responses of the neurons if the neurons respond while the image data is input to the neural network. Then, the detector 31c detects the coordinates and the distortion amount of the image for which the neurons responded, and outputs the coordinates and the distortion amount to the processor 31d.

The processor 31d extracts a candidate image from the input image based on the coordinates that are input. The processor 31d corrects the distortion of the candidate image based on the distortion amount that is input. The processor 31d outputs the corrected candidate image to the determiner 15.

The sequence of performing the extraction of the candidate image and the correction of the distortion can be modified as appropriate. For example, in the processor 31d, the candidate image may be extracted after the distortion of the input image is corrected.

Thereafter, the processing of the determiner 15 and the reader 16 is similar to that of the reading system 1 illustrated in FIG. 1.

In the reading system 3 according to the modification, the cut out and/or the correction of the image is performed using a neural network. Therefore, the candidate image can be extracted with higher accuracy even when it is difficult to extract the contour from the binarized image because the contrast ratio of the display region of the segment display and the outer frame of the display region is not large. Accordingly, compared to the reading system 1, it is possible to read the numerical value of the segment display in the input image with higher accuracy.

Figure 7:
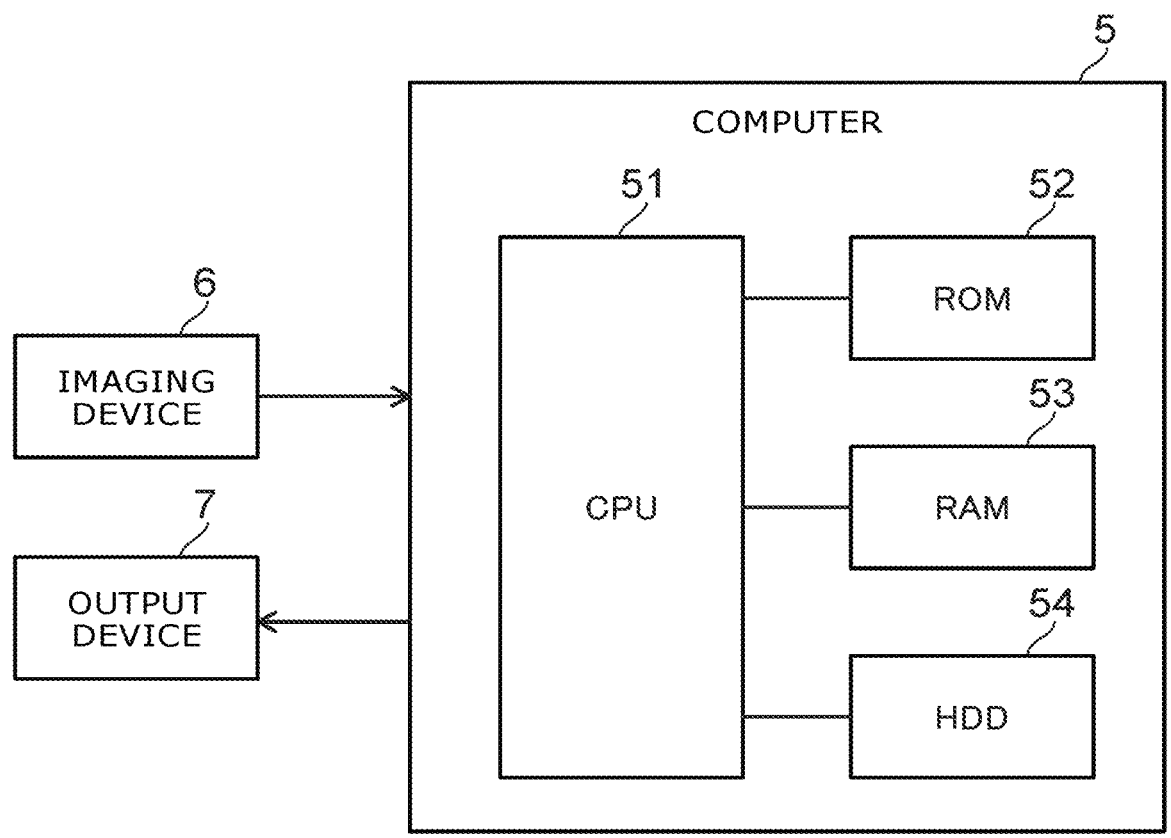
FIG. 7 is a block diagram illustrating a hardware configuration for realizing the reading systems according to the embodiments.

FIG. 7 is a block diagram illustrating a hardware configuration for realizing the reading systems according to the embodiments.

For example, the reading systems according to the embodiments include a reading device 5 and an imaging device 6 illustrated in FIG. 7. The reading device 5 is, for example, a computer and includes ROM (Read Only Memory) 51, RAM (Random Access Memory) 52, a CPU (Central Processing Unit) 53, and a HDD (Hard Disk Drive) 54.

The ROM 51 stores programs controlling the operations of the computer. The ROM 51 stores programs necessary for causing the computer to function as the extractor, the converter, the determiner, the reader, the searcher, etc., of the embodiments described above.

The RAM 52 functions as a memory region where the programs stored in the ROM 51 are loaded. The CPU 53 reads a control program stored in the ROM 51 and controls the operation of the computer according to the control program. The CPU 53 loads various data obtained by the operation of the computer into the RAM 52. The HDD 54 functions as the memory part 18 of the embodiments described above and stores information necessary for reading, and information obtained in the reading process.

When the reading system 4 that utilizes a neural network is realized using the reading device 5, the reading device 5 also may include a GPU (Graphics Processing Unit) and/or a dedicated chip specifically for the processing of the neural network. Instead of the HDD 54, the reading device 5 may include an eMMC (embedded Multi Media Card), a SSD (Solid State Drive), a SSHD (Solid State Hybrid Drive), etc.

The imaging device 6 images the subject (the segment display) and transmits the acquired image to the reading device 5. The imaging device 6 is, for example, a camera.

An output device 7 outputs the data (the numerical value of the segment display that is read) output from the reading device 5 so that the user can recognize the data. The output device 7 is, for example, a monitor, a printer, a speaker, etc.

For example, the reading device 5, the imaging device 6, and the output device 7 are connected to each other by a wired or wireless technique. Or, these devices may be connected to each other via a network. Or, at least two of the reading device 5, the imaging device 6, or the output device 7 may be embedded in one device. For example, the reading device 5 may be embedded in an integral body with an image processor of the imaging device 6, etc.

By using the reading systems and the reading methods according to the embodiments described above, a numerical value that is displayed in a segment display can be read with higher accuracy. Similarly, a numerical value that is displayed in a segment display can be read by a computer with higher accuracy by using a program for causing the computer to operate as the reading system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A reading system, comprising:
an extractor configured to extract a candidate image from an input image, the candidate image being of a portion of the input image in which a segment display is imaged;
a determiner configured to
obtain a plurality of straight lines detected in the candidate image,
subdivide the candidate image into a plurality of areas,
extract a part of the plurality of areas in which a prescribed number or more of end points of the plurality of straight lines exist, as end point groups,
calculate vectors connecting adjacent end point groups to each other, and
determine whether or not the candidate image is an image of a segment display based on at least one of a ratio of sizes of adjacent vectors or an angle between the adjacent vectors; and
a reader configured to read a numerical value displayed in the segment display from the candidate image determined to be the image of the segment display.

2. The system according to claim 1, wherein
the determiner is further configured to determine that the candidate image is the image of the segment display when the ratio of the sizes is in a first range and the angle is in a second range, the first range and the second range being preset.

3. The system according to claim 1, further comprising:
a converter configured to
convert, when the candidate image is distorted, the candidate image to approach an image that is imaged from a front, and
correct a size of the candidate image to approach a specified size when the size of the candidate image is different from the specified size, the specified size being preset,
wherein the determiner is further configured to perform the determination by using the converted candidate image.

4. The system according to claim 1, wherein the extractor is further configured to:
extract a contour from the input image,
calculate a surface area of a region surrounded with the contour,
extract, based on the contour, an image having a prescribed shape from the input image when the calculated surface area is not less than a preset threshold, and
output, as the candidate image, the extracted image satisfying a preset condition.

5. The system according to claim 1, wherein the extractor is further configured to search for a portion of the input image matching a predetermined template image of a segment display to be read, and extract the matching portion as the candidate image.

6. The system according to claim 5, wherein the extractor is further configured to:
extract a feature from the input image,
correct the input image to cause the extracted feature to match a feature of the template image, and
extract the candidate image matching the template image from the corrected input image.

7. The system according to claim 1, wherein the extractor is further configured to:
input data of the input image to a neural network, the neural network being pretrained, and
detect, based on an output result of the neural network, the portion of the input image in which the segment display is imaged, and extract the portion as the candidate image.

8. The system according to claim 7, wherein the extractor is further configured to correct a distortion of the candidate image based on the output result of the neural network.

9. The system according to claim 1, further comprising an imager configured to acquire the input image by imaging the segment display.

10. The system according to claim 9, wherein the imager is further configured to image a video image, and cut out, from the video image, the input image in which the segment display is imaged.

11. An apparatus, comprising:
processing circuitry configured to
extract a candidate image from an input image, the candidate image being of a portion of the input image in which a segment display is imaged;
obtain a plurality of straight lines detected in the candidate image;
subdivide the candidate image into a plurality of areas;
extract part of the plurality of areas in which a prescribed number or more of end points of the plurality of straight lines exist, as end point groups;
calculate vectors connecting adjacent end point groups to each other; and
determine whether or not the candidate image is an image of a segment display based on at least one of a ratio of sizes of adjacent vectors or an angle between the adjacent vectors.

12. The apparatus according to claim 11, wherein the processing circuitry is further configured to read a numerical value displayed in the segment display from the candidate image determined to be the image of the segment display.

13. The apparatus according to claim 11, wherein the processing circuitry is further configured to determine that the candidate image is the image of the segment display when the ratio of the sizes is in a first range and the angle is in a second range, the first range and the second range being preset.

14. The apparatus according to claim 11, wherein the processing circuitry is further configured to
extract a contour from the input image,
calculate a surface area of a region surrounded with the contour,
extract, based on the contour, an image having a prescribed shape from the input image when the surface area is not less than a preset threshold, and
output, as the candidate image, the extracted image satisfying a preset condition.

15. A processing method, comprising:
extracting a candidate image from an input image, the candidate image being of a portion of the input image in which a segment display is imaged;
obtaining a plurality of straight lines detected in the candidate image;
subdividing the candidate image into a plurality of areas;
extracting part of the plurality of areas in which a prescribed number or more of end points of the plurality of straight lines exist, as end point groups;
calculating vectors connecting adjacent end point groups to each other; and
determining whether or not the candidate image is an image of the segment display based on at least one of a ratio of sizes of adjacent vectors or an angle between the adjacent vectors.

16. The processing method according to claim 15, further comprising reading a numerical value displayed in the segment display from the candidate image determined to be the image of the segment display.

17. The processing method according to claim 15, wherein the candidate image is determined to be the image of the segment display when the ratio of the sizes is in a first range and the angle is in a second range, the first range and the second range being preset.

18. The processing method according to claim 15, further comprising
    extracting a contour from the input image,
    calculating a surface area of a region surrounded with the contour,
    extracting an image having a prescribed shape, based on the contour, from the input image when the calculated surface area is not less than a preset threshold, and
    outputting the extracted image satisfying a preset condition as the candidate image.

19. A non-transitory computer-readable storage medium storing a program, the program causing a computer to execute the processing method according to claim 15.

\* \* \* \* \*